United States Patent [19]
Wehberg

[11] Patent Number: 5,334,921
[45] Date of Patent: Aug. 2, 1994

[54] CIRCUIT ARRANGEMENT FOR OPERATING A MULTI-PHASE SYNCHRONOUS MOTOR IN A DIRECT VOLTAGE NETWORK

[75] Inventor: Josef Wehberg, Bühl, Fed. Rep. of Germany

[73] Assignee: Robert Bosch GmbH, Stuttgart, Fed. Rep. of Germany

[21] Appl. No.: 920,565

[22] PCT Filed: Dec. 20, 1990

[86] PCT No.: PCT/DE91/00884
§ 371 Date: Aug. 20, 1992
§ 102(e) Date: Aug. 20, 1992

[87] PCT Pub. No.: WO92/11689
PCT Pub. Date: Jul. 9, 1992

[30] Foreign Application Priority Data
Dec. 20, 1990 [DE] Fed. Rep. of Germany ....... 4040926

[51] Int. Cl.$^5$ ............................................. H02P 6/02
[52] U.S. Cl. ................................. 318/721; 318/722; 318/724; 318/432; 318/254
[58] Field of Search ............... 318/138, 254, 432, 433, 318/439, 596, 609, 690, 702, 705, 720, 721, 722, 724

[56] References Cited
U.S. PATENT DOCUMENTS

| | | |
|---|---|---|
| 4,125,796 | 11/1978 | Nagase et al. . |
| 4,371,818 | 2/1983 | Lewis . |
| 4,383,205 | 5/1983 | Guisinger . |
| 4,431,953 | 2/1984 | Schray et al. . |
| 4,447,771 | 5/1984 | Whited . |
| 4,565,956 | 1/1986 | Zimmermann et al. . |
| 4,633,150 | 12/1986 | Inaji et al. . |
| 4,651,068 | 3/1987 | Meshkat-Razavi . |
| 4,686,437 | 8/1987 | Langley et al. . |
| 4,814,674 | 3/1989 | Hrassky . |
| 4,922,513 | 5/1990 | Joichi . |
| 5,041,774 | 8/1991 | Komatsu . |

FOREIGN PATENT DOCUMENTS

| | | |
|---|---|---|
| 0332057 | 9/1989 | European Pat. Off. . |
| 0363169 | 4/1990 | European Pat. Off. . |
| 3042819 | 6/1982 | Fed. Rep. of Germany . |
| 3610253 | 10/1987 | Fed. Rep. of Germany . |
| 2665787 | 6/1991 | France . |
| 57-43588 | 3/1982 | Japan . |

OTHER PUBLICATIONS

EDN Electrical Design News, vol. 32, No. 18, Sep. 3rd, 1987, Newton, Mass., pp. 227–234; Artusi D. et al.: "Solid-State Devices . . . ".
Conference Proceedings 1989, Mar. 13th, 1989, Baltimore, Md., pp. 81–90; T. M. Jahns et al.: "Integrated Current Regulation . . . ".
Siemens Zeitschrift, vol. 46, No. 4, Apr. 1972, Erlangen, DE, pp. 274–276; M. Liska: "Simotron K, drehzahlgeregelte . . . ".

*Primary Examiner*—Bentsu Ro
*Attorney, Agent, or Firm*—Spencer, Frank & Schneider

[57] ABSTRACT

A circuit arrangement for operating a multi-phase synchronous motor includes a switching device (13) composed of semiconductor switches (14–16) for the successive connection of the winding phases (u, v, w) of the armature winding (10) to a direct mains voltage and a commutation device (21) for the actuation of the semiconductor switches (14–16) in the correct sequence by means of switching signals (S1–S3) in conformance with the rotary position of the rotor. In order to reduce commutation noise and radio interference with low circuit engineering expenditures, each control input (G) of the semiconductor switches (14–16) is preceded by an analog difference former (18–20) which receives, on the one hand, the switching signal (S1–S3) associated with the semiconductor switch (14–16) and, on the other hand, a reference signal derived from the phase sum current of the armature winding (10). The semiconductor switches (14–16) are here fully energized as long as the amplitude of the switching signal (S1–S3) is greater than the amplitude of the reference signal.

10 Claims, 3 Drawing Sheets

CIRCUIT ARRANGEMENT FOR OPERATING A MULTI-PHASE SYNCHRONOUS MOTOR IN A DIRECT VOLTAGE NETWORK

BACKGROUND OF THE INVENTION

The invention is based on a circuit arrangement for operating a synchronous motor of the type defined in the preamble of claim 1 and including a multi-phase armature winding in a direct voltage network.

In a known circuit arrangement of this type for a three-phase synchronous motor (DE 3,940,569) the switching signals are configured, in order to reduce commutation noise and radio interference, so that the two switching signals for the semiconductor switches associated with the commutating winding phases overlap one another in time. In the overlap region, one of the two switching signals is clocked in such a way that the average of the phase current increases in the up-commutating winding phase and decreases in the down-commutating winding phase, namely linearly or according to an exponential function. However, this type of commutation requires relatively high expenditures for circuitry.

SUMMARY OF THE INVENTION

In contrast thereto, the circuit arrangement according to the invention including the characterizing features of claim 1 has the advantage of low expenditures for circuitry with relatively little commutation noise and very low radio interference which makes additional interference suppression measures unnecessary. During the commutation, that is, during the transition of the current from the one winding phase to the other winding phase, the analog control of the semiconductor switches has a positive effect in that only a slight current steepness occurs. This again causes only slight excess voltages so that inverse diodes and voltage limiters are not required. Because of the absence of the steep switching edges, there is also hardly any radio interference and the commutation noise is noticeably reduced.

The measures defined in the further claims permit advantageous modifications and improvements of the circuit arrangement defined in claim 1.

According to a preferred embodiment of the invention, the reference signal is picked up as a voltage drop across a resistor through which flows the phase sum current of the armature winding and is suitably amplified.

The circuit arrangement according to the invention can be employed for synchronous motors in which the winding phases of the armature winding are connected in a wye configuration, independently of whether the neutral point is brought out or not.

If the neutral point is brought out, a so-called half-wave control can be realized if, according to one embodiment of the invention, a semiconductor switch is connected in series with a respective winding phase and the parallel series connections are connected with the direct mains voltage, on the one hand, by way of the neutral point and, on the other hand, by way of the resistor which picks up the winding sum current.

A so-called full-wave control can be realized if, according to a further embodiment of the invention, pairs of semiconductor switches are connected in series and a winding phase of the armature winding is connected at each one of their respective connection points. This results in a number of parallel series connections which correspond to the number of winding phases or conductors. The parallel series connections are connected jointly to the direct mains voltage by way of the resistor for picking up the sum current in the armature winding. This full-wave control improves motor utilization. The number of phases in the armature winding is not subject to any limitations. If a three-phase winding is involved, the armature winding may also be connected in a delta configuration.

In a preferred embodiment of the invention, an operational amplifier, more precisely a differential amplifier, is employed as the difference former and a power MOS field effect transistor (power MOSFET) is employed as the semiconductor switch. This results in a low-power transistor actuation.

According to a further embodiment of the invention, the edges of the periodic rectangular pulses of which the switching signals are composed are sloped at an angle less than 90° so that the ascending edges of the rectangular pulses of the switching signal associated with the next armature winding phase in the direction of current flow and the descending edges of the rectangular pulses of the switching signal associated with the preceding winding phase in the direction of current flow overlap one another in time. With this configuration of the switching signals, the commutation noise can be reduced even more noticeably.

According to a further embodiment of the invention, the amplitudes of the switching signals are limited as a function of the number of revolutions, which can be realized by means of a revolution controller configured as a P or PI controller. The actual number of revolutions is here derived from the switching signals.

BRIEF DESCRIPTION OF THE DRAWING

In the description that follows, the invention will be discussed in greater detail with reference to embodiments thereof that are illustrated in the drawing, in which.

DESCRIPTION OF THE PREFERRED EMBODIMENTS

Figure 1:
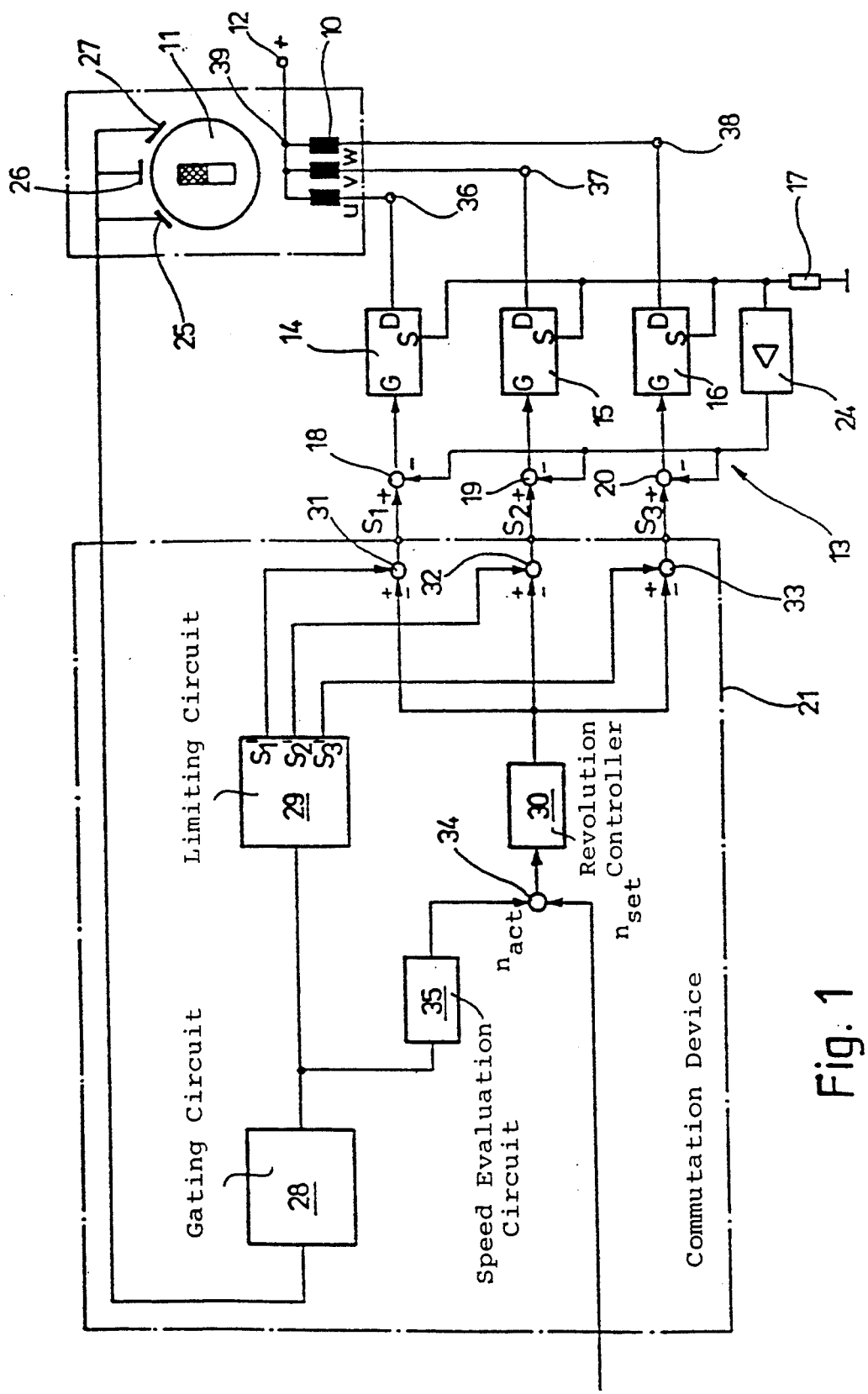
FIG. 1 is a circuit diagram of a circuit arrangement for operating a three-phase synchronous motor with electronic commutation (EC motor) in a direct voltage network.

In the block circuit diagram shown in FIG. 1, the reference numeral 10 identifies the three-phase armature winding of the synchronous motor whose winding conductors or winding phases u, v, w are accommodated in the stator of the synchronous motor. The rotor, which is configured as a permanent magnet rotor, is marked 11. It is here shown symbolically as having two poles, but may also have a different number of poles. The winding phases u, v, and w are combined at their one winding end into a neutral point 39 which is brought out of the synchronous motor and is connected to the positive pole "+" of a direct voltage network 12. The three free winding terminals 36, 37 and 38 of the three winding phases u, v, and w that are disposed on a terminal board are connected with a switching device 13 which is connected to the other potential of the direct voltage network.

Switching device 13 includes three schematically shown power transistors 14, 15, and 16 which are each connected in series with one of the winding phases u, v, and w. As can be seen in conjunction with FIG. 2, each power transistor 14-16 is formed by a power MOSFET 22 whose drain D is connected to the associated winding phase u or v or w, respectively, and whose source S is connected by way of a resistor 17 to the lower potential of the direct voltage network 12. The sources S of all power MOSFET's 22 are here connected to the direct voltage network 12 by way of the same resistor 17. Power transistors 14, 15 and 16 are controlled by difference formers 18, 19 and 20 which receive, on the one hand, the reference signal derived from the sum current of armature winding 10 and, on the other hand, switching signals generated by a commutation device 21 as a function of the rotary position of the rotor. According to FIG. 2, each difference former 18-20 is formed of a differential amplifier 23 whose output is connected with the gate G of power MOSFET 22. The reference signal is here applied to the inverting input 231 and the switching signal to the non-inverting input 232 of differential amplifier 23. In order to obtain the reference signal, the voltage drop across resistor 17 is picked up, is converted by means of an amplifier 24 into a sufficiently high voltage and is then applied to the inverting inputs 231 of the three differential amplifiers 23.

Figure 3:
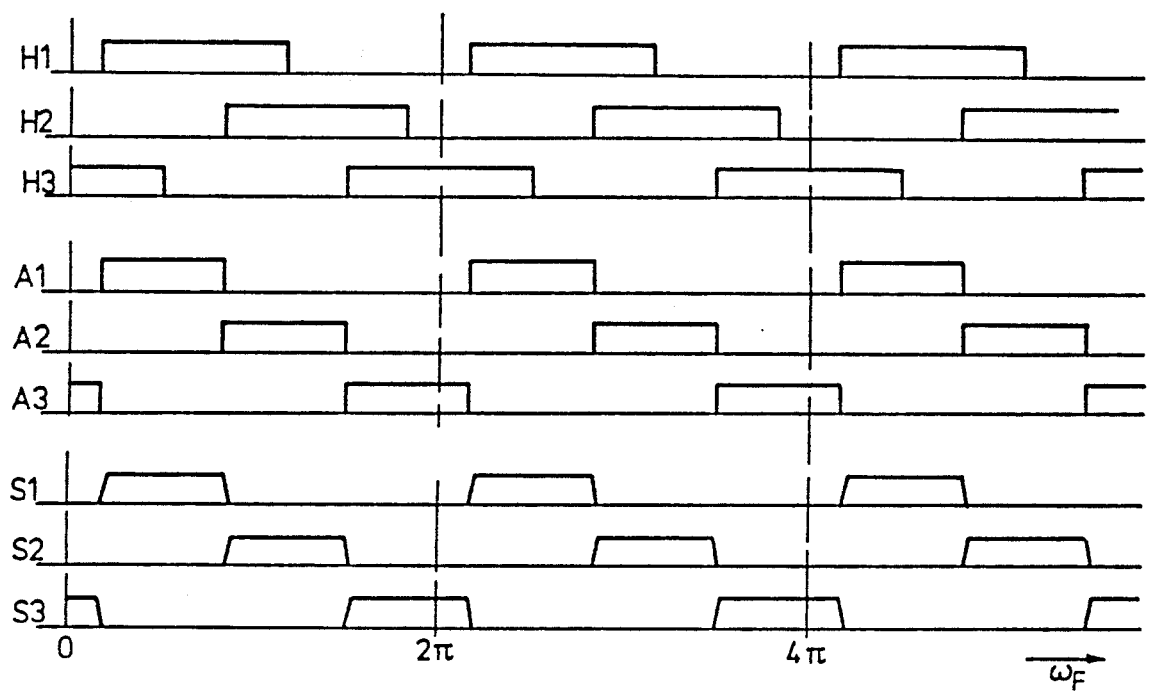
FIG. 3 is a diagram of various signals in the circuit arrangement according to FIG. 1.

The switching signals generated in commutation device 21 are shown in FIG. 3 and are there—as in FIG. 1—marked S1, S2 and S3. In each case, one of the three switching signals S1-S3 is connected to the non-inverting input 231 of the difference formers 18-20 which are each configured as a differential amplifier 23. To generate the switching signals, three stationary position sensors 25, 26 and 27 that are offset relative to one another by the same circumference angles are arranged at the rotor circumference and generate output signals H1, H2 and H3 corresponding to the rotary position of rotor 11. These output signals from position sensors 25-27 are shown at the top of FIG. 3. In a gating circuit 28, these three output signals H1, H2 and H3 are converted into a three-phase signal A1, A2, A3 without overlap and with a pitch of $2\pi/3$. The three-phase signal A1, A2, A3 is fed to a block 29 which limits the steepness of the rectangular pulses. The three switching signals S1', S2' and S3' are present at the output of block 29, each composed of a sequence of periodic rectangular pulses whose ascending and descending edges extend at an angle of less than 90°. Since the three switching signals S1', S2' and S3' are mutually shifted in phase by $2\pi/3$, the same as the three-phase signal A1, A2, A3, the ascending edges of the rectangular pulses of the switching signal associated with the subsequent winding phase of armature winding 10 in the direction of current flow and the descending edges of the rectangular pulses of the switching signal associated with the preceding winding phase of armature winding 10 in the direction of current flow overlap one another in time. These switching signals S1', S2' and S3' which essentially correspond to the switching signals S1-S3 at the output of commutation circuit 21 shown at the bottom of the diagram, could now be fed directly to the non-inverting inputs 232 of the three differential amplifiers 23. In the commutation device 21 employed here, switching signals S1'-S3' are additionally limited as a function of the number of revolutions. For this purpose, switching signals S1', S2' and S3' are fed to three difference formers 31, 32 and 33 which subtract a value put out by a revolution controller 30 from the amplitudes of switching signals S1', S2' and S3', so that now switching signals S1, S2 and S3 are present at the output of commutation device 21, which are each fed to one of the three difference formers 18-20. Revolution controller 30 is configured as a P or PI controller which receives the difference between a predetermined set revolution value $n_{set}$ and a measured actual revolution value $n_{act}$. For this purpose, revolution controller 30 is preceded by a further difference former 34 to which is applied, on the one hand, the set revolution value $n_{set}$ and, on the other hand, the actual revolution value $n_{act}$. The actual revolution value $n_{act}$ is determined in a block 35 by an evaluation of the edges of signals A1-A3.

Figure 2:
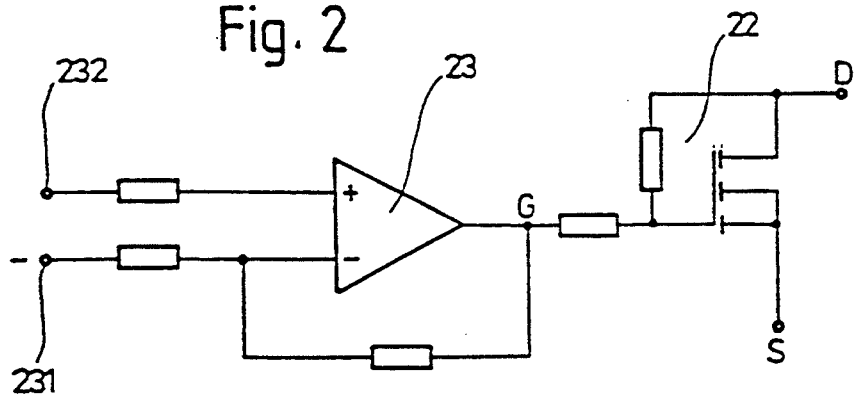
FIG. 2 is a block circuit diagram for the difference former and semiconductor switch in the circuit arrangement of FIG. 1.
Figure 4:
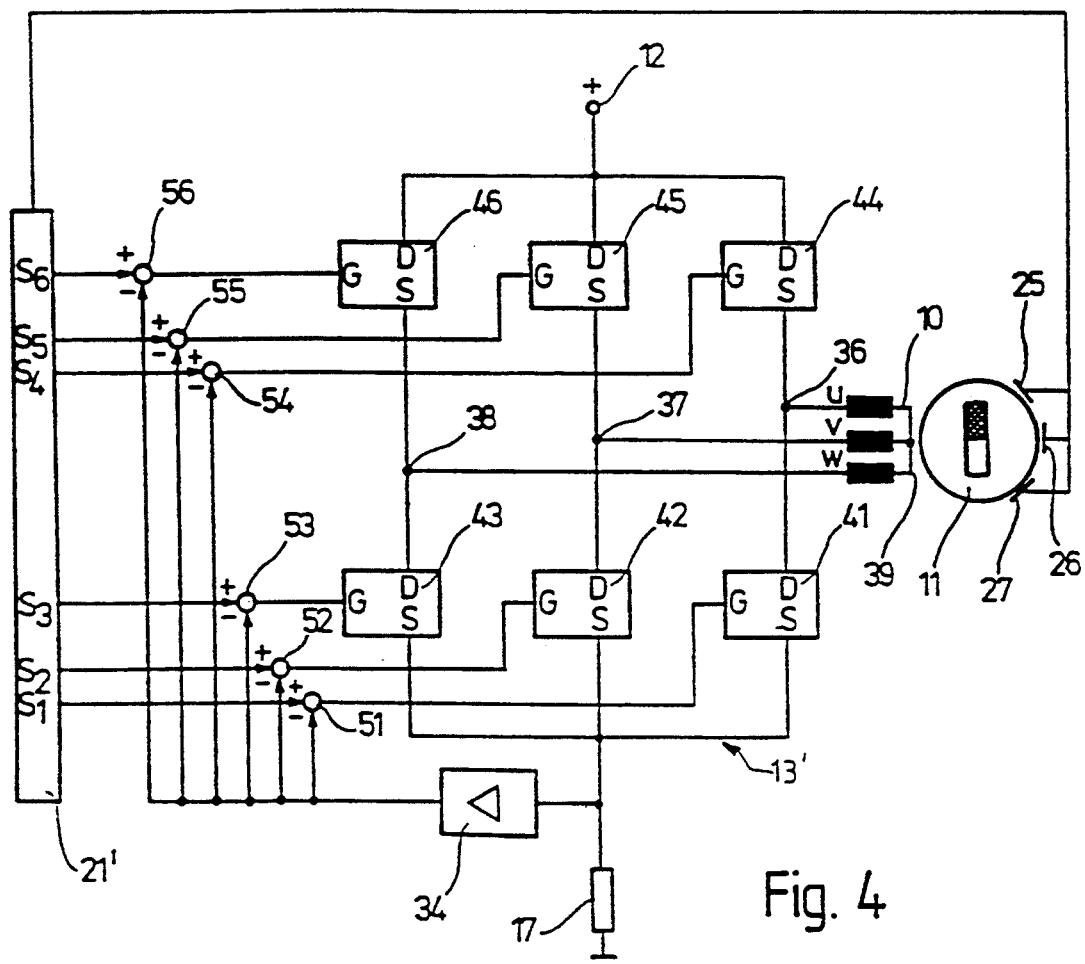
FIG. 4 is a block circuit diagram for a circuit arrangement for operating a three-phase EC motor according to a further embodiment.

In the circuit arrangement shown in FIG. 4, the neutral point 39 of the three-phase armature winding 10 connected in wye configuration is not accessible, only the three winding terminals 36, 37 and 38 which are disposed on a terminal board. Here, switching device 13' as a whole includes six power transistors 41-46 all configured as power MOSFET's 22 according to FIG. 2. Pairs of power transistors are here connected in series, for example 41 and 44, 42 and 45, and 43 and 46. Their common connection point is connected in each case with one of the winding terminals 36-38. All three series connections of power transistors 41-46 are connected in parallel and the parallel connection is connected by way of resistor 17 to the direct voltage network 12. The drain D is here connected with the positive pole "+" of direct voltage network 12 and the source S with resistor 17 which is connected with the negative pole of direct voltage network 12. Each gate G is again preceded by a difference former 51-56 which, as in FIG. 2, is configured as a differential amplifier 23. In the same manner as in FIGS. 1 and 2, the voltage drop picked up across resistor 17 and suitably amplified by amplifier 24 is fed to the inverting inputs 231 of difference formers 51-56 and switching signals S1-S6 from commutation device 21' are fed to the non-inverting inputs 232. In this circuit arrangement, a so-called full-wave control of the EC motor is realized in contrast to the half-wave control performed in the circuit arrangement of FIG. 1. This full-wave control results in a better utilization of the EC motor. In a three-phase armature winding 10, the winding conductors or winding phases u, v, and w may also be connected in a delta configuration. The commutation device 21' furnishes a total of six switching signals S1-S6 which are derived from the output signals H1-H3 of position sensors 25-27, with switching signals S1-S6 being shifted in time relative to one another in a suitable manner so that two of the power transistors 41-46 are conductive simultaneously to perform the full-wave control and these two power transistors 41-46 are conmutated successively each time in conjunction with a further power transistor.

The invention is not limited to the above-described embodiments. In particular, the number of phases of the armature winding is subject to no limitations.

Instead of obtaining the switching signals from the position sensors, the switching signals may also be obtained by sensor-less detection of the position of the rotor, utilizing the voltage induced in the armature winding. Such a sensor-less position detection is disclosed, for example, in DE 3,042,819.A1.

I claim:

1. A circuit arrangement for operating a synchronous motor including a multi-phase armature winding in a direct voltage network, the arrangement comprising a switching device for the successive connection of the winding phases of the armature winding to a direct mains voltage, the switching device including a plurality of semiconductor switches that are associated with the individual winding phases, and a commutation device for the actuation in the proper sequence of the semiconductor switches by means of switching signals in conformance with the rotary position of the rotor of the synchronous motor, characterized in that each control input (G) of the semiconductor switches (14–16; 41–44) is preceded by an analog difference former (18–20; 51–56) which receives, on the one hand, the switching signal (S1-S3; S1-S6) associated with the semiconductor switch (14–16; 41–46) and, on the other hand, a reference signal derived from the phase sum current of the armature winding (10); and the actuation of the semiconductor switches (14–16; 41–46) is effected by the difference formers (18–20; 51–56) in such a manner that the semiconductor switches (14–16; 41–46) are fully energized as long as the amplitude of the switching signal (S1-S3; S1-S6) is greater than the amplitude of the reference signal.

2. A circuit arrangement according to claim 1, characterized in that the reference signal is formed by suitable amplification from the voltage drop picked up at a resistor (17) through which flows the phase sum current of the armature winding (10).

3. A circuit arrangement according to claim 2 in which the neutral point of the armature winding that is connected in a wye configuration is brought out, characterized in that each semiconductor switch (14–16) is connected in series with a respective winding phase (u, v, w) of the armature winding (10) and the series connections are connected in parallel with the direct mains voltage via the neutral point (39) and the resistor (17).

4. A circuit arrangement according to claim 2 for a in which the armature winding is connected in a wye configuration, characterized in that pairs of semiconductor switches (41, 44 and 42, 45 and 43, 46, respectively) are connected in series and a winding phase (u, v, w) of the armature winding (10) is connected to the respective connection point (36–38) of the semiconductor switches; and the number of parallel series connections of pairs of semiconductor switches (41–46) corresponding to the number of winding phases (u, v, w) are connected by way of the resistor (17) to the direct mains voltage.

5. A circuit arrangement according to claim 1, characterized in that a differential amplifier (23) is employed as the difference former (18–20; 51–56) and a power MOSFET (22) is employed as the semiconductor switch (14–16; 41–44); and the reference signal is applied to the inverting input (231) of the differential amplifier (23) while the associated switching signal (S1-S3; S1-S6) is applied to the non-inverting input (232) of the differential amplifier (23).

6. A circuit arrangement according to claim 1, characterized in that each switching signal (S1-S3) is composed of periodic rectangular pulses whose edges ascend and descend at an angle less than 90°; and the ascending edges of the rectangular pulses of the switching signal (S1-S3) associated with the next winding phase (u, v, w) of the armature winding (10) in the direction of current flow and the descending edges of the rectangular pulses of the switching signal (S1-S3) associated with the preceding winding phase (u, v, w) in the direction of current flow overlap one another in time.

7. A circuit arrangement according to claim 1, characterized in that the amplitudes of the switching signals (S1-S3) are limited as a function of the number of revolutions.

8. A circuit arrangement according to claim 7, characterized in that the limitation of the number of revolutions is effected in the difference formers (31–33) which each receives, on the one hand, a switching signal (S1'-S3') and, on the other hand, the output signal of a revolution controller (30).

9. A circuit arrangement according to claim 8, characterized in that the revolution controller (30) is a P controller or a PI controller which receives the difference between the actual number of revolutions ($n_{act}$) measured at the rotor (11) and a set number of revolutions ($n_{set}$).

10. A circuit arrangement according to claim 9, characterized in that the actual number of revolutions ($n_{act}$) is derived from the switching signals (A1-A3).

* * * * *